(12) United States Patent
Yoshida et al.

(10) Patent No.: US 8,419,575 B2
(45) Date of Patent: Apr. 16, 2013

(54) BALL-TYPE TENSIONER

(75) Inventors: Osamu Yoshida, Osaka (JP); Yuji Kurematsu, Osaka (JP); Atsushi Hayami, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 201 days.

(21) Appl. No.: 13/081,124

(22) Filed: Apr. 6, 2011

(65) Prior Publication Data

US 2011/0269584 A1    Nov. 3, 2011

(30) Foreign Application Priority Data

Apr. 28, 2010 (JP) .................................. 2010-103812

(51) Int. Cl.
*F16H 7/08* (2006.01)
(52) U.S. Cl.
USPC .......................................... 474/110; 474/109
(58) Field of Classification Search .................. 474/111, 474/110, 109, 104, 103, 101, 273
See application file for complete search history.

(56) References Cited

U.S. PATENT DOCUMENTS

| | | | |
|---|---|---|---|
| 6,935,978 B2* | 8/2005 | Hayakawa et al. | 474/109 |
| 7,189,174 B2* | 3/2007 | Yamamoto et al. | 474/109 |
| 2003/0134703 A1 | 7/2003 | Saitoh et al. | |

\* cited by examiner

*Primary Examiner* — Michael Mansen
*Assistant Examiner* — Juan Campos, Jr.
(74) *Attorney, Agent, or Firm* — Howson & Howson LLP (57) ABSTRACT

A tensioner for a chain or similar power transmission medium comprises a spring-biased plunger having annular rack teeth with gradually sloping forward surfaces and steeper rearward surfaces. The teeth are engaged by radially movable balls received in inclined grooves in an axially movable annular ball seat disposed in an annular groove formed in the wall of a plunger-accommodating hole in a tensioner housing. The bottoms of the inclined grooves face a steep rearward surface of a rack tooth, and the annular ball seat is axially movable in the annular groove and biased in the plunger protruding direction by a spring that exerts a biasing force greater than the biasing force exerted on the plunger. The balls and the movable annular ball seat block retraction of the plunger on engine start-up, but permit retraction when excessive force is imparted to the plunger while the plunger is in a protruding condition.

4 Claims, 12 Drawing Sheets

BALL-TYPE TENSIONER

CROSS REFERENCE TO RELATED APPLICATIONS

This application claims priority on the basis of Japanese Patent Application 2010-103812, filed on Apr. 28, 2010. The disclosure of Japanese Patent Application 2010-103812 is incorporated by reference.

FIELD OF THE INVENTION

The invention relates to a ball-type tensioner for applying tension to a timing chain for driving a camshaft and, optionally, other components of an engine.

BACKGROUND OF THE INVENTION

In a typical tensioner for maintaining tension in an engine timing chain, a plunger for exerting the tensioning force protrudes from a plunger-accommodating hole in a tensioner housing, and is slidable in the plunger-accommodating hole. The plunger is biased in the protruding direction by a plunger-biasing spring and by hydraulic pressure exerted by oil in a high pressure oil chamber formed by the plunger and the tensioner housing.

Figure 13:
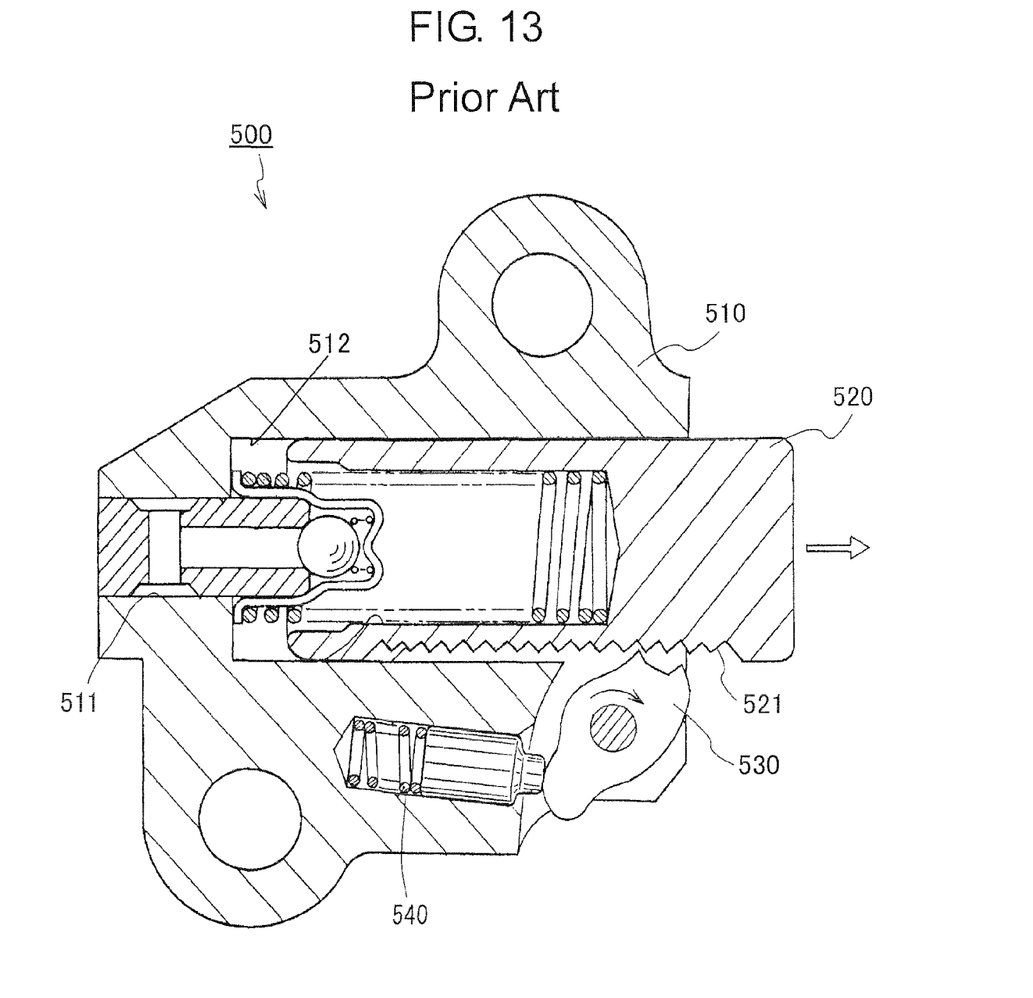
FIG. 13 is a cross-sectional view of a prior art tensioner.

FIG. 13 shows a typical prior art tensioner 500, referred to as a "ratchet type tensioner." A plunger 520 is slidable in, and protrudes from, a plunger-accommodating hole 512 in a housing 510. The plunger-accommodating hole is supplied with oil under pressure through an oil supply port 511 from an oil pump or other source of oil under pressure. The plunger 520 is biased by a spring in the protruding direction such that it can apply tension to a traveling timing chain. A ratchet mechanism comprises a pawl 530 pivoted on the housing 510 and a set of a ratchet teeth 521 formed as a rack of teeth along the plunger 520. A check valve allows oil to flow through the oil supply port 511 into the high pressure oil chamber formed by the plunger and the plunger-accommodating hole, but blocks reverse flow of oil as disclosed in United States Patent Application Publication 2003/0134703, published on Jul. 17, 2003.

In the ratchet-type tensioner 500 the teeth of pawl 530 are pressed against the ratchet teeth 521 by a pawl-biasing spring 540, which allows the plunger 520 to advance when the timing chain becomes slack, but limits retracting movement of the plunger by exerting a "wedge" effect on the ratchet teeth 521. Limiting the retracting movement of the plunger becomes important to avoid "flip-flop" noises that occur upon engine start-up when oil in the high pressure oil chamber is depleted, as is often the case when the engine is first started after having been out of operation for a long time.

The prior art ratchet-type tensioner 500 can reduce flip-flop noises if the plunger backlash, i.e., the amount of retracting movement allowed by the ratchet mechanism, is small. However, in some cases, when the plunger has protruded excessively, the ratchet pawl can cause the plunger 520 to remain in the excessively protruded condition and thereby apply an excessive force to the timing chain, causing a so-called "beat note" or "whirring" noise.

Another problem is that the plunger 520 in tensioner 500 can seize, causing excessive tension in the timing chain over a long time.

In the tensioner 500, the ratchet teeth 521 are formed along a narrow elongated part of the outer circumference of the plunger. A slight rotation of the plunger will prevent the teeth of the pawl from engaging the ratchet teeth uniformly over the full width of the pawl teeth. The resulting eccentric tooth engagement can result in excessive loads causing chipping of the ratchet teeth or the teeth of the pawl. Such chipping can quickly lead to failure of the ratchet mechanism.

SUMMARY OF THE INVENTION

An aim of the invention is to solve the above-described problems by providing a ball-type tensioner that has one or more of the following effects. First, it reduces "flip-flop" noises by blocking retracting displacement of the plunger caused by forces applied to the plunger by a timing chain on starting an engine after the engine has been inoperative for a long time. Second, it eliminates the "beat note" generated by excessive chain tension caused by excessive protrusion of the plunger during operation of the engine, by permitting retracting displacement of the plunger. Third, it prevents seizure of the plunger. Finally the tensioner is simple, easy to assemble, and exhibits excellent durability.

The ball-type tensioner according to the invention comprises a reciprocable plunger for maintaining tension in a traveling timing chain. The plunger has an outer peripheral surface in which a plurality of annular rack teeth is formed. the tensioner also comprises a housing having a plunger-accommodating hole from which the plunger protrudes and in which the plunger is reciprocably slidable in protruding and retracting directions. A plunger-biasing spring biases the plunger in the protruding direction. An annular ball seat fits around the plunger and is displaceable along the directions of protrusion and retraction of the plunger. The ball seat is located within an annular groove formed in the wall of the plunger-accommodating hole, and has a plurality of ball-guiding grooves in which balls can move radially outward relative to the plunger. A ball seat-biasing spring is engaged with a surface of the annular ball seat and biases the ball seat in the direction of protrusion of the plunger. The tensioner also includes a set of balls in contact with the outer peripheral surface of the plunger. The balls are sequentially engageable with successive rack teeth of the plunger by moving radially outward in the ball-guiding grooves of the annular ball seat. A sealing plate surrounding, and in fitting relationship with, the plunger, engages the balls and limits axial displacement of the balls, the annular ball seat, and the ball seat-biasing spring, in the direction of protrusion of the plunger within the annular groove. Each rack tooth has a forward surface facing in the protruding direction of the plunger and a rearward surface facing in the retracting direction. The forward surfaces of the rack teeth have a diameter that decreases proceeding in the protruding direction, and the rearward surfaces have a diameter that decreases proceeding in the rearward direction. The slope of the rearward surfaces relative to the protruding and retracting directions is greater than the slope of the forward surfaces relative to the protruding and retracting directions. The ball-guiding grooves of the annular ball seat have an inclined bottom surface that faces a rearward face of a rack tooth. Each of the balls simultaneously contacts the inclined bottom surface of a ball-guiding groove, the plunger and the sealing plate.

The ball-type tensioner according to the invention is simple and easily manufactured and exhibits excellent durability. In addition, it can reduce "flip-flop" noises that occur on engine start-up by blocking retraction of the plunger when the engine is started after having been out of operation for a long time. Blocking of retraction of the plunger is achieved because the balls of the tensioner are sandwiched between the steep rear face of a rack tooth on the plunger and the inclined bottom surfaces of the ball-guiding grooves in the annular ball seat, while still in contact with the gradually sloping forward face of a rack tooth on the plunger.

When the chain tension drops as the timing chain becomes loose and the plunger protrudes, the balls, which are in contact with the gradually sloping forward face of a rack tooth, are pushed radially outward, and cause the annular ball seat to move in the retracting direction. At this time the balls are no longer sandwiched between the steep rear face of a rack tooth on the plunger and the inclined bottom surfaces of the ball-guiding grooves. The balls can then cross over a tooth of the rack permitting the plunger to advance. After crossing a tooth, the balls are pushed radially inward by the inclined surfaces of the ball-guiding groove and toward a gradually sloping forward face of another rack tooth, whereupon the balls are again sandwiched between the steep rear face of another rack tooth on the plunger and the inclined bottom surfaces of the ball-guiding grooves, and the plunger is latched in a more advanced position. The advancing displacement of the plunger thus balances the chain tension in a repeating series of operations, ensuring optimal tension in the timing chain.

If excessive chain tension occurs when the plunger is an excessively protruding condition, the force exerted through the balls by the steeply sloped rearward side of a rack tooth pushes the annular ball seat rearward, away from the sealing plate in the retracting direction. The balls move outward and cross over one rack tooth, whereupon the balls are pushed inward and against a gradually sloping forward face of a next rack tooth and again sandwiched again between a steep rearward face of a rank tooth and the inclined bottom surfaces of the annular ball seat. By a series of repetitions of this operation, the plunger can be made to retract. Seizing of the plunger can thereby be prevented and the "beat note" or "whirring" noise that is generated by increased chain tension when the plunger is in an excessively protruding condition can be eliminated.

In a preferred embodiment, the slopes of the forward and rearward surfaces of the rack teeth are sufficiently steep that the center of a ball disposed between a rearward surface and an adjacent forward surface of rack tooth is always within the annular groove. Because the centers of the balls always reside within the annular groove in the wall of the plunger-accommodating hole, the balls always roll between a steeply sloping rear face of an annular rack tooth on the plunger and the inclined bottom surfaces of the annular ball seat without falling out of the annular groove. Accordingly, it is possible to achieve quick and steady response to increases and decreases in chain tension.

The annular ball seat preferably has at least three ball-guiding grooves formed therein, and the ball-guiding grooves in the annular ball seat are disposed at uniform intervals around the ball seat. The use of at least three uniformly spaced bell-guiding grooves makes it possible to eliminate eccentric radial loads as the plunger advances and retracts. Accordingly, the forces acting on the annular ball seat are equally dispersed, the plunger can advance and retract smoothly in response to changes in chain tension, and the useful life of the annular ball seat can be extended.

The biasing force exerted by the ball seat-biasing spring is also preferably greater than the biasing force exerted by the plunger-biasing spring. Accordingly, when the plunger retracts, the annular ball seat can also retract, allowing the balls to move radially outward without moving along with the plunger in the retracting direction. The force exerted by the ball seat-biasing spring also pushes the balls steadily toward a root of the rack teeth when the balls cross over a rack tooth. The annular ball seat also steadily pushes the balls toward a root of the rack teeth when the balls cross over a rack tooth as the plunger advances.

DETAILED DESCRIPTION OF THE PREFERRED EMBODIMENTS

Figure 1:
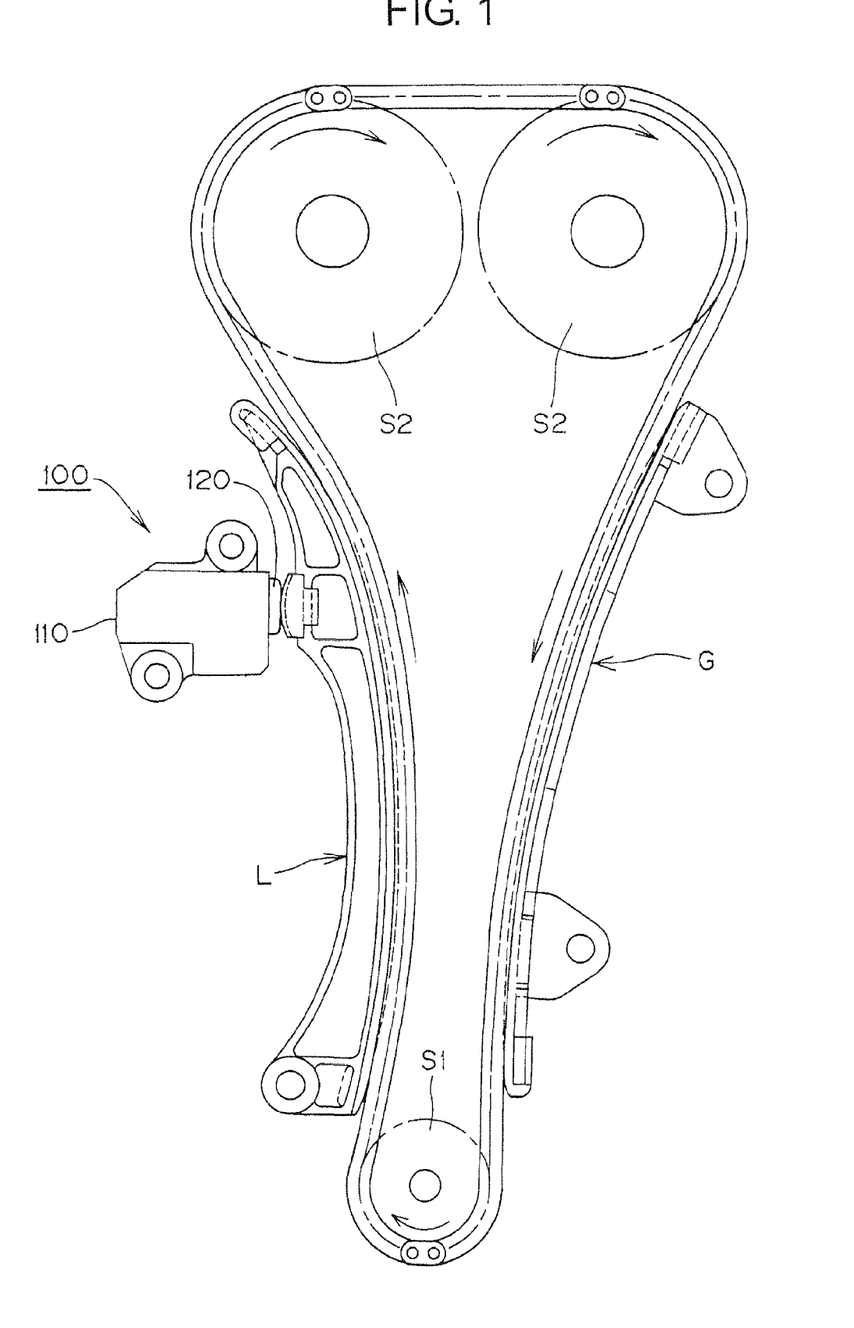
FIG. 1 is a schematic front elevational view of an engine timing drive incorporating a ball-type tensioner according to the invention.

As shown in FIG. 1, a ball-type tensioner 100, which is mounted on an dual overhead cam (DOHC) internal combustion engine (not shown) is disposed adjacent the slack side of a timing chain C, which is driven by a crankshaft sprocket S1 end in driving relationship camshaft sprockets S2. The protruding plunger 120 of tensioner 100 engages a pivoted lever L, which, in turn, applies tension to the slack-side of the timing chain C.

A stationary guide G, mounted on the engine, guides the tension side of the timing chain C.

An arrow on crankshaft sprocket S1 indicates the direction of its rotation. When the crankshaft sprocket rotates, the timing chain C travels in the direction indicated by arrows adjacent the chain, causing the camshaft the sprockets S2 to rotate.

Figure 2:
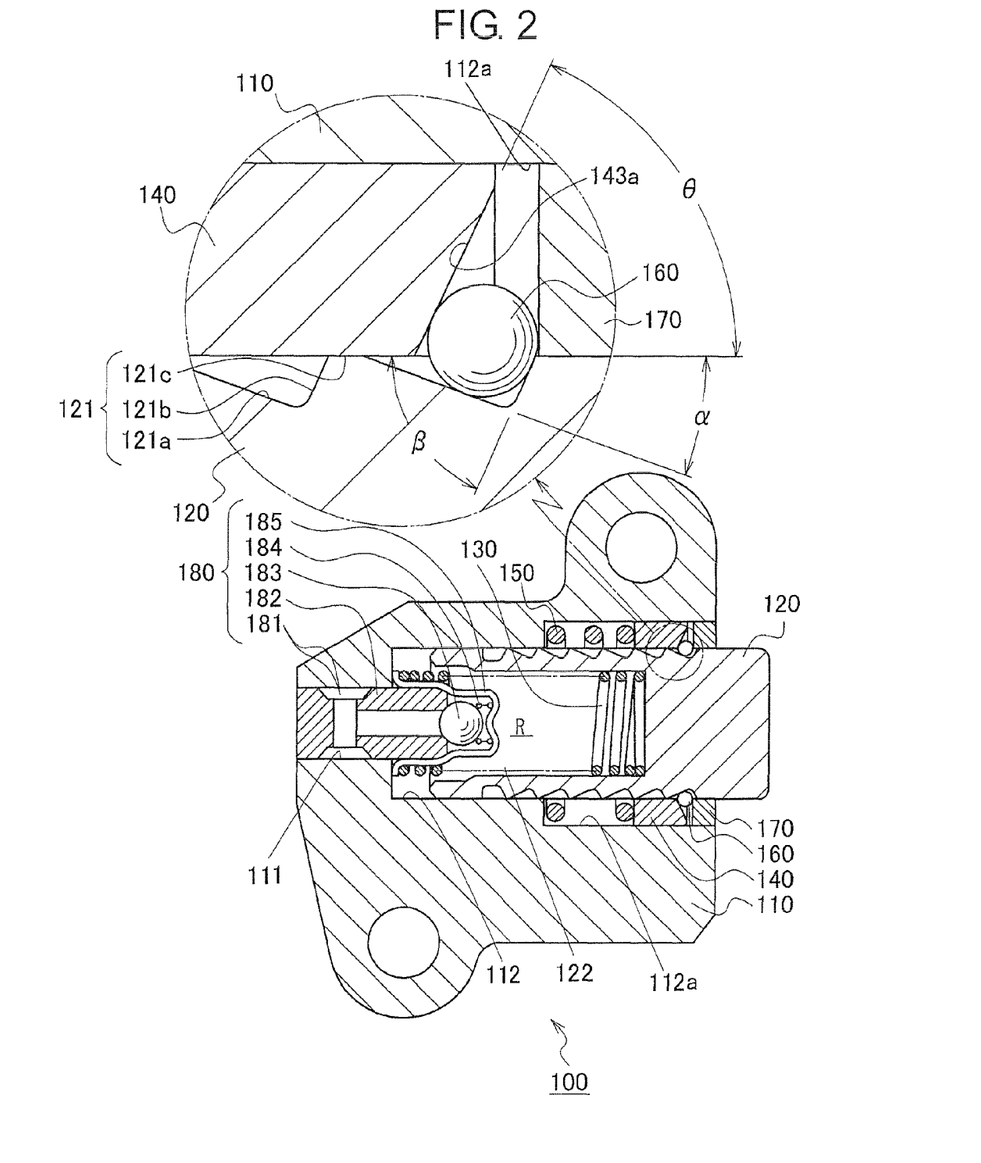
FIG. 2 is a cross-sectional view of the tensioner.

As shown in FIG. 2, the housing 110 of tensioner 100 has an oil supply passage 111 for introducing oil supplied under pressure through an engine block from an oil pump (not shown). The housing has a plunger-accommodating hole 112 and a plunger 120 slidable in the hole 112 and protruding therefrom. A plunger biasing spring 130 biases the plunger 120 in the protruding direction.

An annular ball seat 140 fits around the plunger 120 and is displaceable in the direction of plunger movement within an annular groove 112*a* formed in the wall of the plunger-accommodating hole 112 adjacent the opening thereof through which the plunger protrudes. A ball seat biasing spring 150 presses against a spring-abutting end 141 (FIG. 4) of the annular ball seat 140, urging the ball seat in the direction of protrusion of the plunger 120. Four balls 160, which are engageable with rack teeth 121 formed on the outer peripheral surface of the plunger 120, are arranged to roll in inclined ball-guiding grooves 143 (FIG. 4) formed in radial surface 142 of the annular ball seat 140. The plunger is movable through a sealing plate 170, which fits around the plunger. This sealing plate closes the end of the groove 112a, forms the opening through which the plunger protrudes, and seals the ball seat 140 and the ball seat biasing spring 150 while allowing limited axial displacement of the ball seat.

The biasing force exerted by the ball seat-biasing spring 150 is to be greater than biasing force exerted by the plunger biasing spring 130. Accordingly, when the plunger 120 retracts, the balls 160 can roll radially outward within in the groove 112a without retracting along with the plunger 120. The annular ball seat 140 can also push the balls 160 steadily back toward a root of the rack teeth when the balls cross over a rack tooth.

When the plunger 120 advances in the protruding direction, the balls 160 also move radially outward in groove 112a, and again the annular ball seat 140 steadily pushes the balls toward a root of the rack teeth when the balls cross over a rack tooth, so that steady engagement of the balls 160 with the rack teeth is achieved.

The tensioner 100 is also provided with a check valve assembly 180 at a bottom portion of the plunger-accommodating hole 112 to prevent reverse flow of oil from the high-pressure oil chamber R formed by the plunger-accommodating hole 112 and a hollow internal part 122 of the plunger 120 which receives the plunger-biasing spring.

The check valve assembly 180 is composed of a ball seat 182 having an oil passage 181 connected to the oil supply passage 111 of the housing 110, a check ball 183, seated on a ball seat 182, a ball-biasing spring 184 for pressing the check ball 183 against the seat 182, and a bell-shaped retainer 185 for supporting the ball-biasing spring 184 and for restricting movement of the check ball 183.

Figure 3:
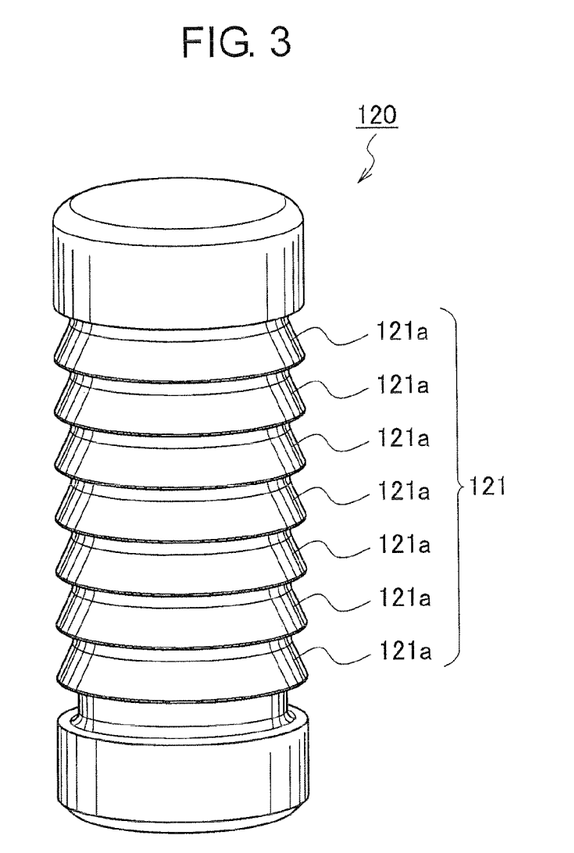
FIG. 3 is a perspective view of a plunger used in the tensioner.

Each of the annular rack teeth 121 formed on plunger 120 has a gradual slope on its forward side 121a. That is, the diameter of the forward side gradually decreases, proceeding in the direction of protrusion of the plunger 120. On the other hand, the rearward sides of the teeth have a steep slope 121b. That is, the diameter of the rearward side decreases rapidly proceeding in the direction of retraction of the plunger. The steep rearward side meets a gradually sloping forward side of an adjacent rack tooth. The teeth have cylindrical outer peripheral surfaces 121c between the gradually sloping forward surfaces 121a and the steep rearward surfaces 121b. These outer cylindrical surfaces 121a can come into sliding engagement with the wall of the plunger-accommodating hole 112. Thus, the plunger 120 can advance and retract while in smooth sliding-contacting with inner peripheral surfaces of the plunger-accommodating hole 112 and the annular ball seat 140.

In the embodiment shown, the gradually sloping forward tooth surface 121a is inclined at an angle $\alpha$ of 20° with respect to the inner peripheral surface of the plunger-accommodating hole 112, and the steeply sloping tooth surface 121b is inclined at an angle $\beta$ of 65° with respect to the inner peripheral surface of the plunger-accommodating hole.

Figure 4:
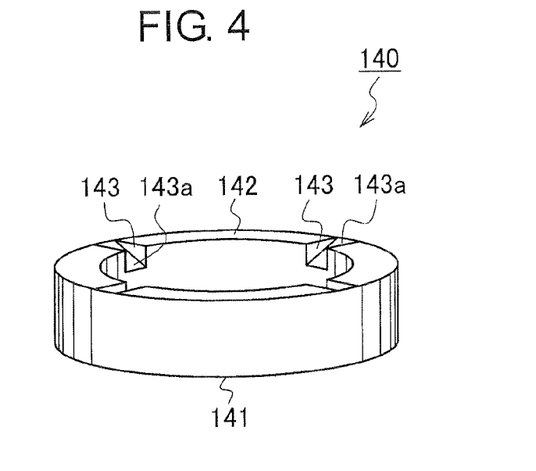
FIG. 4 is a perspective view of an annular ball seat used in the tensioner.

The inclined ball-guiding grooves 143 in the ball seat are disposed equidistantly at four locations along seat surface 142, as shown in FIG. 4. The spacing of the grooves 143 at uniform intervals eliminates eccentric loads in the radial direction, and disperses the reaction forces resulting from backward displacement of the plunger 120 equally.

The ball-guiding grooves 143 formed in surface 142 of the annular ball seat 140 have an inclined bottom surface 143a that faces the steep rearward surface 121b of a rack tooth 121. In the embodiment shown, the angle $\theta$ of the inclined bottom surface 143a relative to the inner peripheral surface of the plunger-accommodating hole 112 is 65°. This arrangement allows smooth movement of the balls 160 and optimal blocking of retracting movement of the plunger 120.

Figure 5:
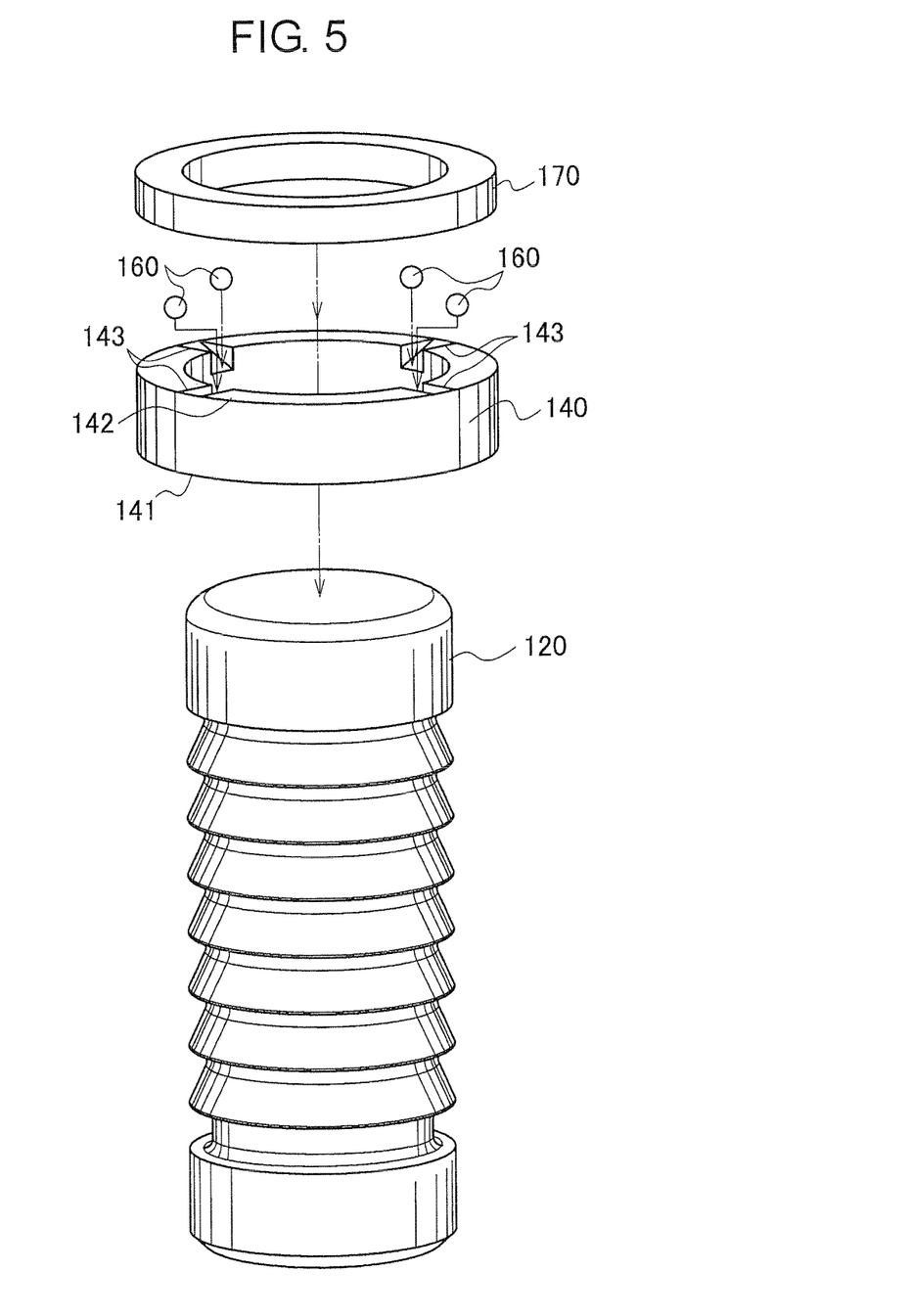
FIG. 5 is an exploded view of the annular ball seat, the balls and the plunger.

The balls 160 are preferably made of steel, and are disposed respectively in the inclined ball-guiding grooves 143. The balls simultaneously contact the annular ball seat 140, the plunger 120, and the sealing plate 170.

The gradually sloping forward tooth surfaces 121a and the steeply sloping rearward tooth surfaces 121b are formed so that the centers of the balls 160 are always located within the groove 112a formed in the wall of the plunger-accommodating hole 112. Consequently, the balls 160 can roll steadily, moving between the steeply sloping rearward surfaces 121b of the plunger and the inclined bottom surfaces 143a of the annular ball seat without falling out of the groove 112a.

Figure 6:
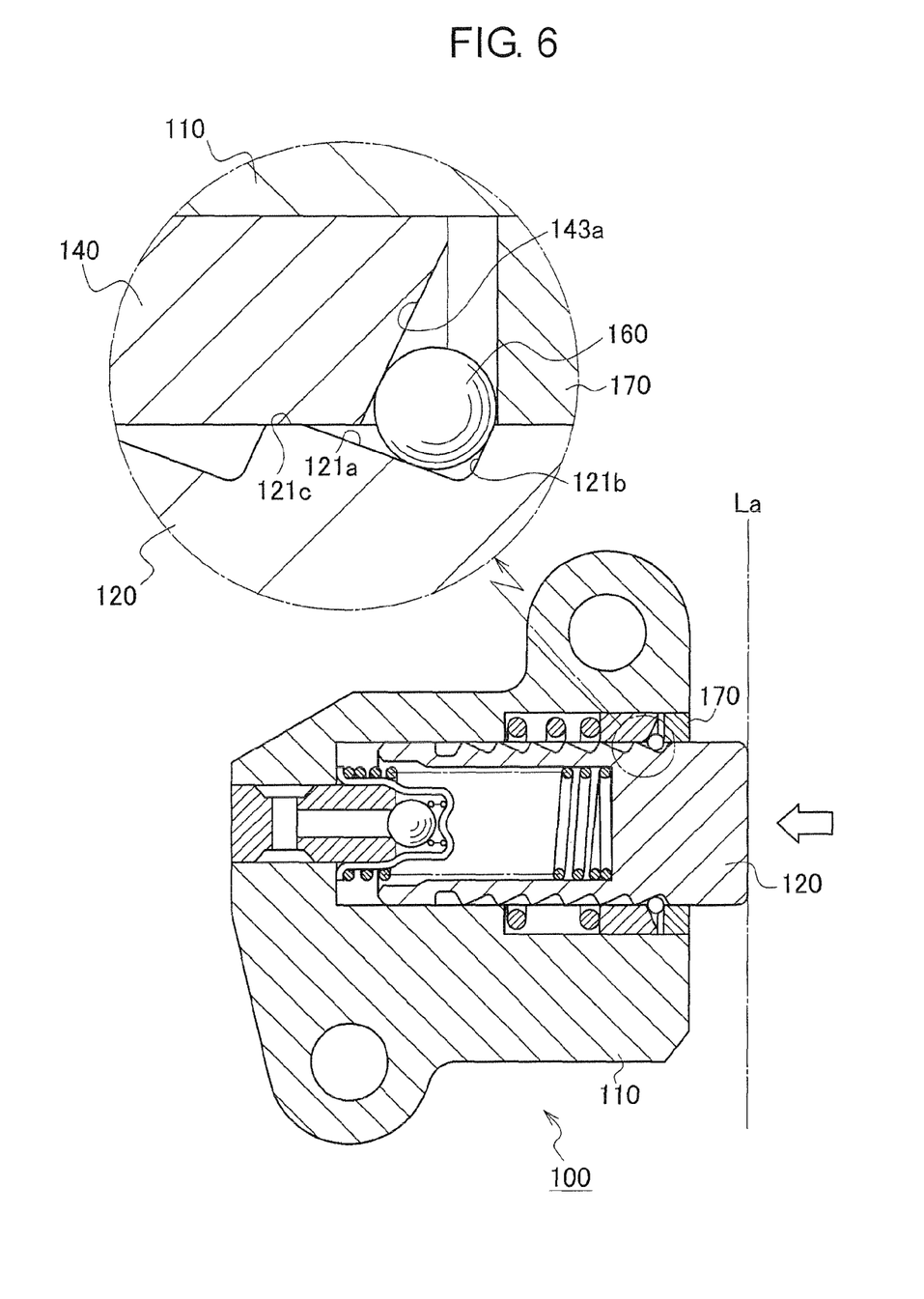
FIG. 6 is a cross-sectional view showing the tensioner in a condition in which retraction of the plunger is blocked at the time of starting of an engine.
Figure 7:
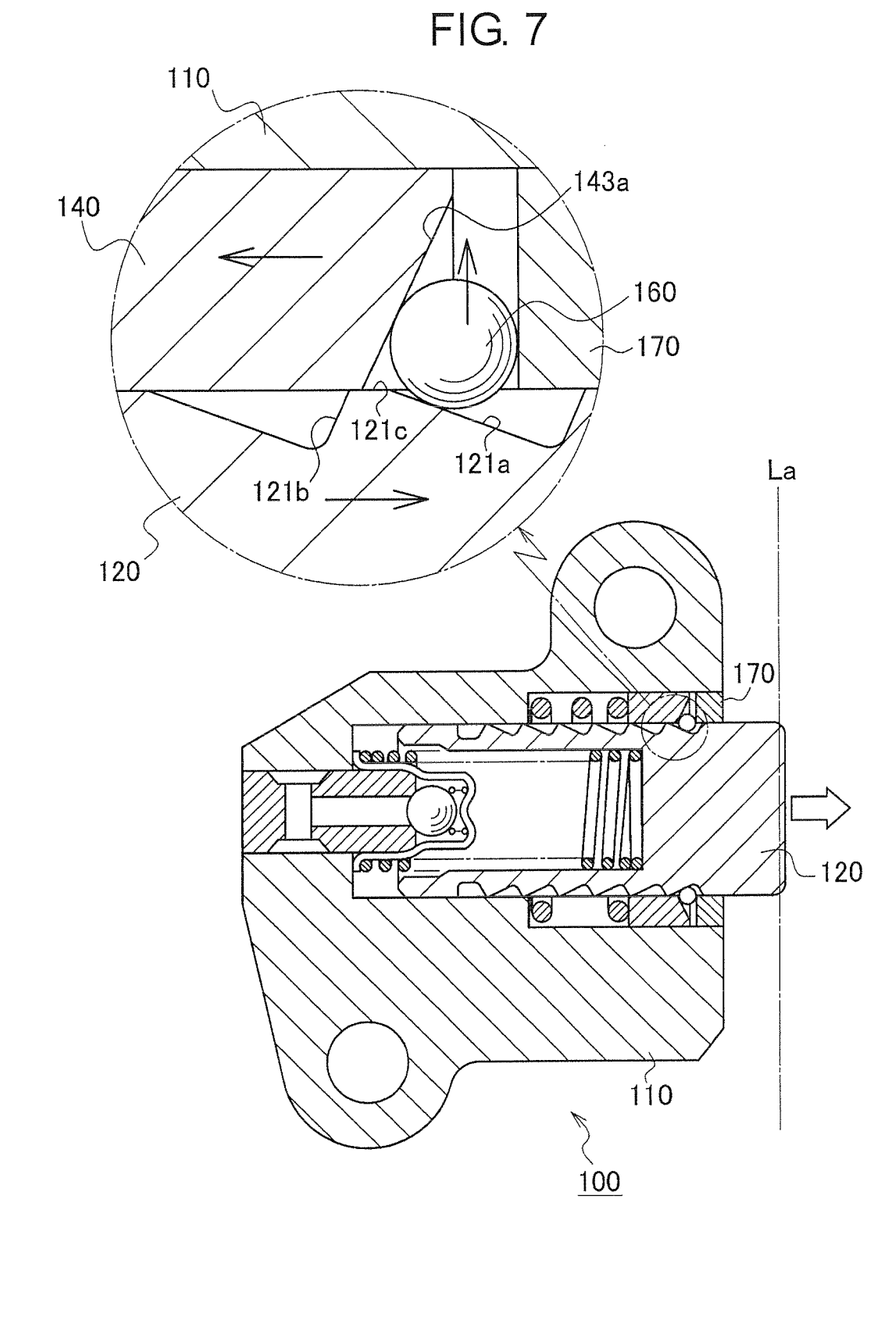
FIG. 7 is a cross-sectional view showing the tensioner in a condition in the plunger is advancing.
Figure 8:
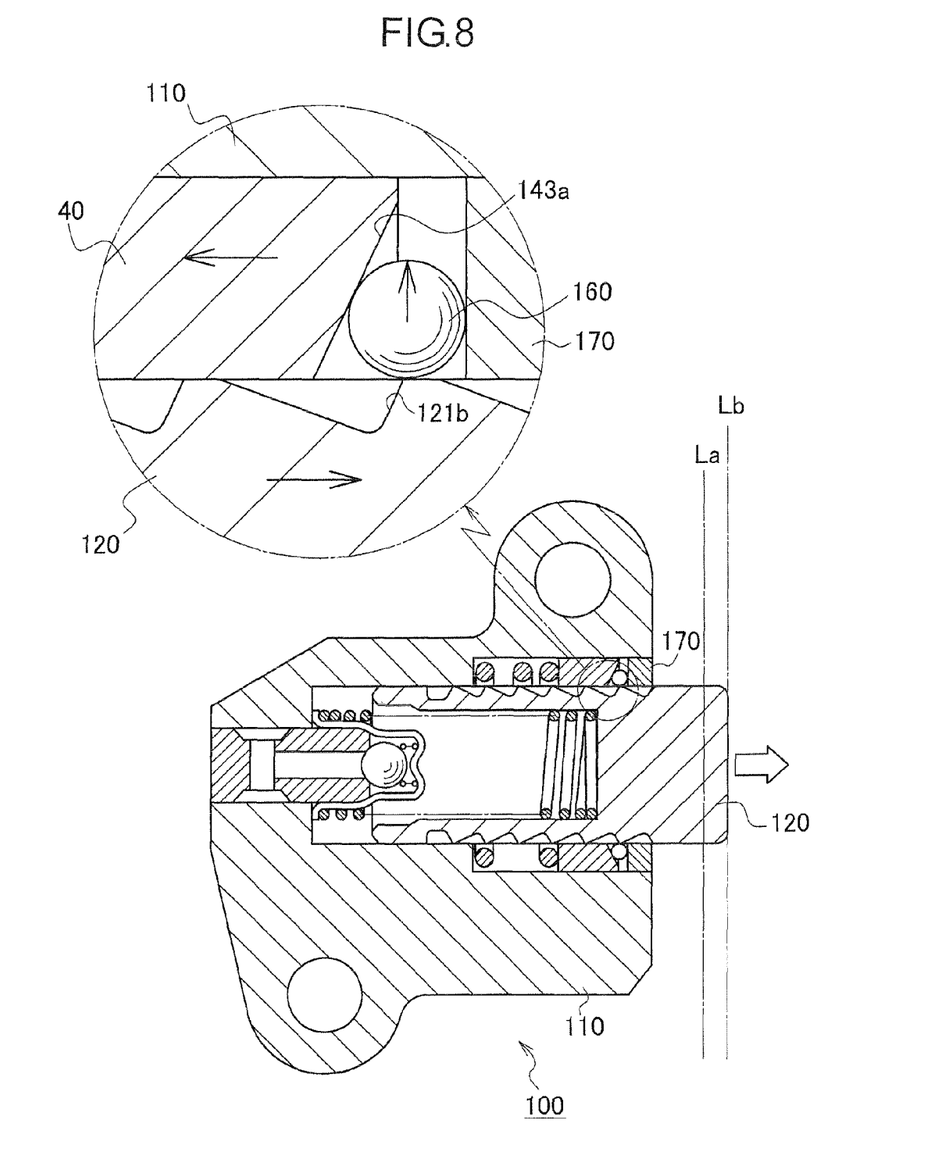
FIG. 8 is a cross-sectional view showing the tensioner in a condition in which the balls cross over a rack tooth as the plunger advances.
Figure 9:
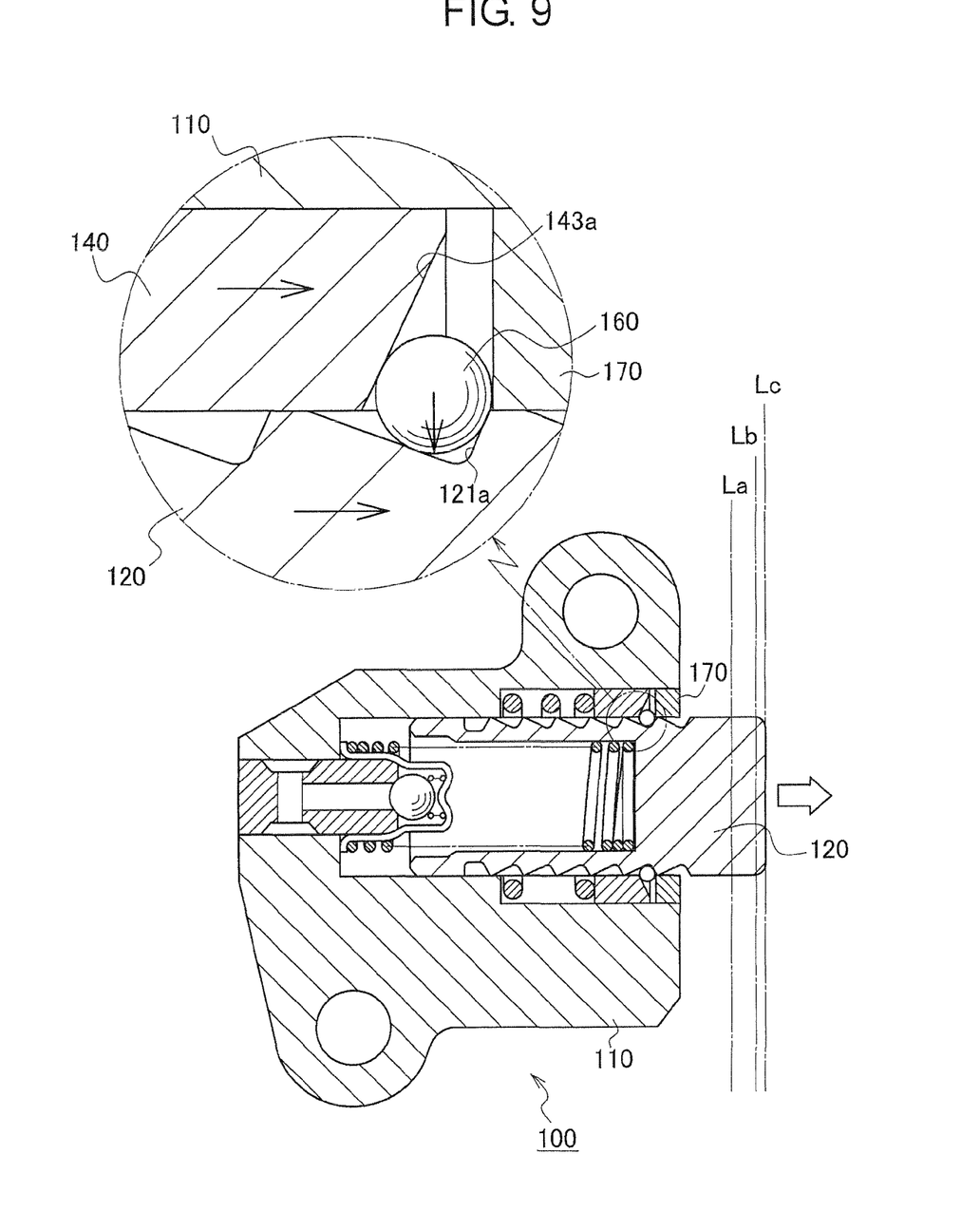
FIG. 9 is a cross-sectional view showing the tensioner in a condition in which retraction of the plunger is blocked after the plunger has advanced.

When the timing chain becomes loose after the engine is started while the plunger is blocked from retraction as shown in FIG. 6, the plunger 120 advances as shown in FIG. 7. As the plunger 120 advances further balls 160 cross over a rack tooth as shown in FIG. 8. After the balls cross over a rack tooth, they return to contact with a steeply sloping rearward surface of the rack tooth and with a gradually sloping forward surface of a next rack tooth as shown in FIG. 9, whereupon retraction of the plunger is again blocked.

Thus, on starting the engine after the engine has been out of operation for a long time, oil in the high pressure oil chamber of the tensioner can become depleted. As shown in FIG. 6, the balls 160 are sandwiched between a steep forward surface 121b of a plunger tooth and the inclined bottom surfaces 143a of the grooves of the annular ball seat, and in contact with a gradually sloping forward tooth surface 121a. The sandwiching of the balls blocks retracting movement of the plunger 120 that would otherwise be caused by a force imparted to the plunger by the timing chain as shown in FIG. 6.

Line La shown in FIG. 6 indicates the position of the protruding end of the plunger 120 when the retracting movement of the plunger is blocked.

When the chain tension drops as the timing chain is becomes loose, and the plunger 120 advances after the engine is started as shown in FIG. 7, the balls 160 are pushed radially outward by a gradually sloping forward tooth surface 121a, and, as the balls are pushed outward, they push the annular ball seat 140 in the retracting direction as shown in FIG. 8. The balls are no longer sandwiched between a steep rearward tooth surface 121b and the inclined bottom surfaces 143a of the annular ball seat 140.

As the plunger continues to move in the protruding direction, the balls 160 cross over a rack tooth as shown in FIG. 8. Then, the balls 160 are pushed radially inward by the annular ball seat 140 as shown in FIG. 9, rolls toward a gradually sloping forward surface 121a of a next tooth, and are again sandwiched between a steep rearward surface 121b and the inclined bottom surfaces, again blocking retracting movement of the plunger 120.

The plunger 120 can advanced by one tooth or by several teeth by repetition of the above-described series of operations, and becomes latched at an advanced position at which the force exerted by the plunger 120 and the chain tension are in balance.

The line La in FIGS. 7 through 9 indicates the position of the protruding end of the plunger 120 retraction-blocking condition state immediately after starting of the engine. Line Lb in FIGS. 8 and 9 indicates the position of the end of the plunger when the ball crosses over a rack tooth. Line Lc in FIG. 9 indicates the position of the end of the plunger 120 when the retraction of the plunger is once again blocked after the balls 160 cross over a rack tooth and engage with a steep rearward tooth surface. Arrows in FIGS. 7 through 9 indicate the directions in which the plunger 120, the annular ball seat 140, and the ball 160, are biased.

Figure 10:
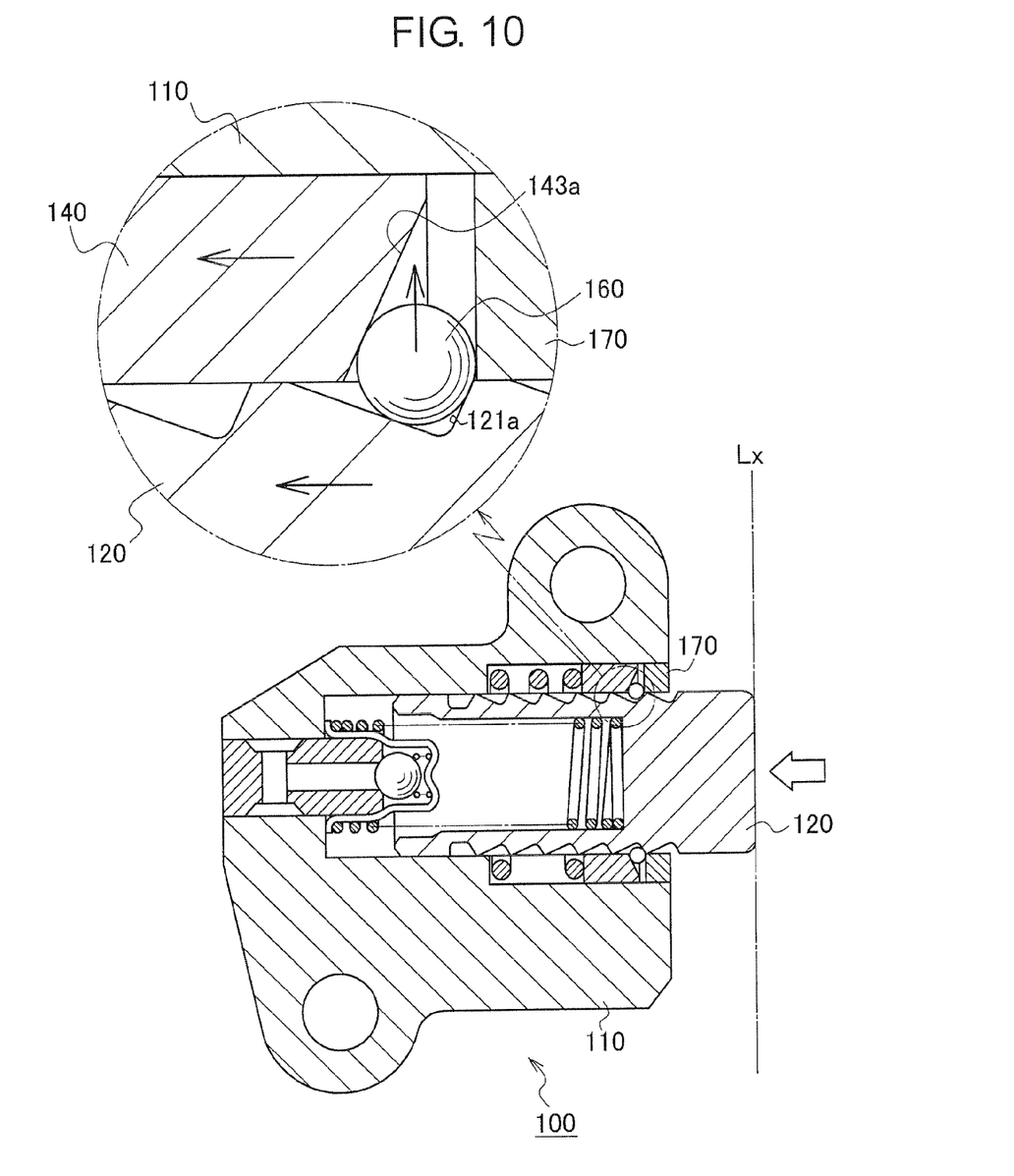
FIG. 10 is a cross-sectional view showing the tensioner in a condition in which the plunger is permitted to retract when it protrudes excessively from the tensioner housing.
Figure 11:
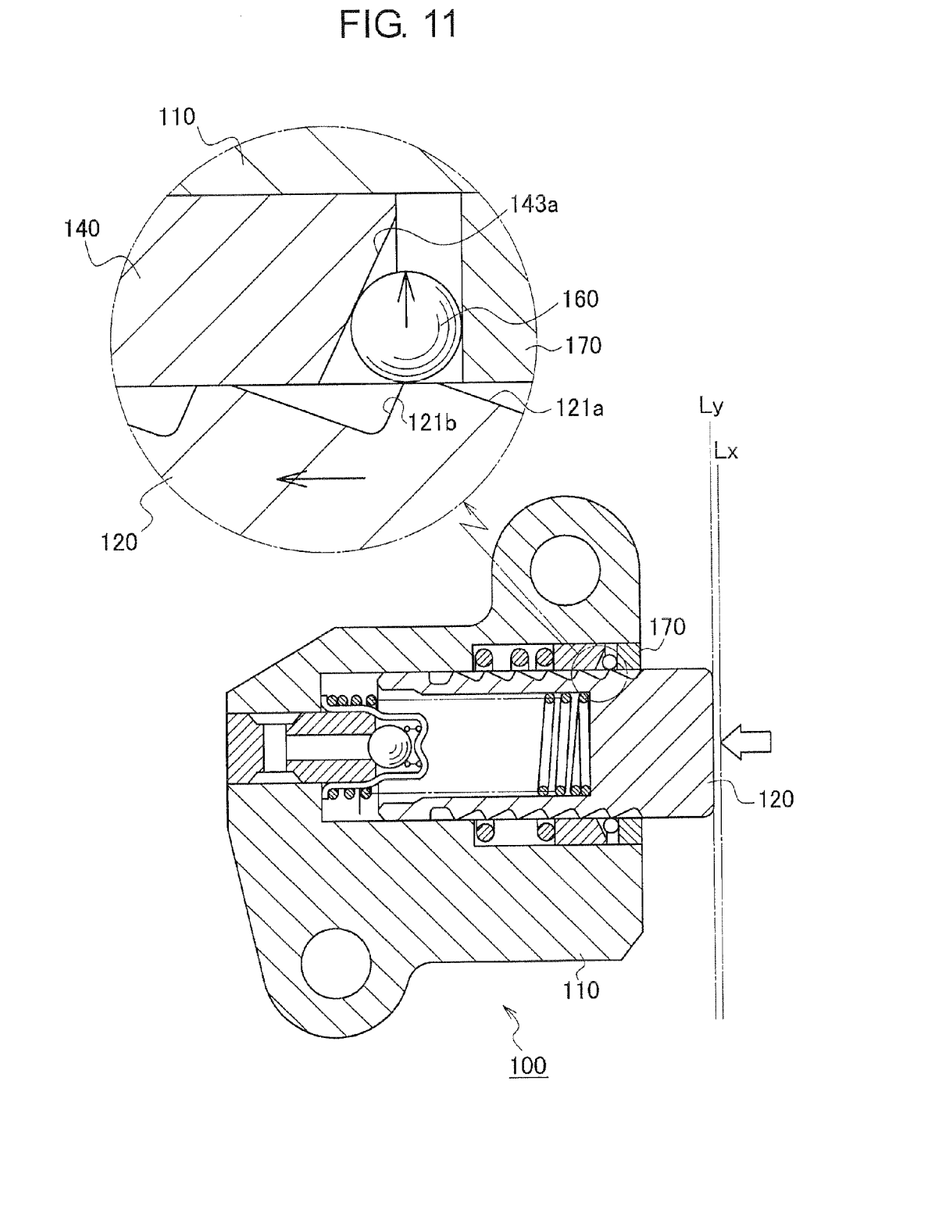
FIG. 11 is a cross-sectional view showing the tensioner in a condition in which the ball cross over a rack tooth as the plunger retracts after having protruded excessively.
Figure 12:
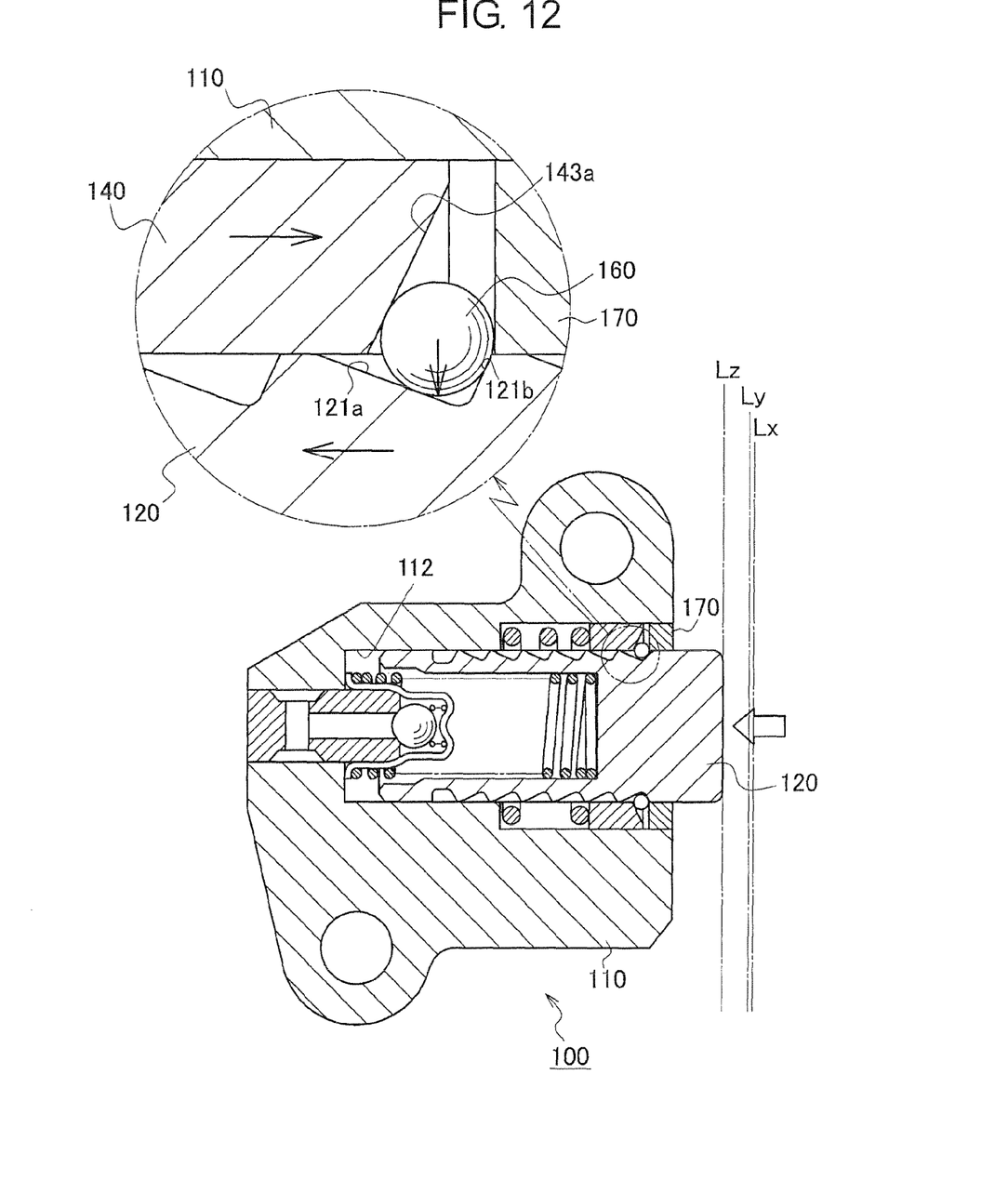
FIG. 12 is a cross-sectional view showing the tensioner in a condition in which shows a state in which retraction of the plunger is blocked after the plunger has protruded excessively.

FIGS. 10-12 illustrate the operations of the tensioner when excessive pressing force is applied to the plunger 120 when the plunger 120 has advanced and protruded excessively. In this case, the plunger 120 retracts and blocking of retraction is released, allowing the plunger 120 to retract further, and allowing the balls to cross over a rack tooth 121, whereupon retraction of the plunger is again blocked.

In FIG. 10, the balls 160, are pushed radially outward by a steep rearward tooth surface 121b, and at the same time, the balls push the annular ball seat 140 in the retracting direction. When the balls reach the position illustrated in FIG. 11, they are no longer sandwiched between a steep rearward slope 121b of the plunger 120 and the inclined bottom surfaces 143a of the annular ball seat 140. After permitting the plunger 120 to retract by crossing over a rack tooth as shown in FIG. 11, the balls 160 are pushed inward by the annular ball seat 140 and move into contact with a next gradually sloping forward surface 121a as shown in FIG. 12. Here, the balls 160 are sandwiched again between a steep rearward tooth surface 121b and the inclined bottom surfaces 143a of the annular ball seat 140, blocking retracting movement of the plunger 120.

The plunger 120 can retracts by one tooth or by several teeth by repetition of the series of operations depicted in FIGS. 10-12, and becomes latched at a position at which the force exerted by the plunger 120 and the chain tension are in balance.

Line Lx in FIGS. 10 through 12 indicates the position of the forward end of the plunger 120 when retraction is blocked. Line Ly in FIGS. 1 and 12 indicates the position the end of the plunger 120 when the ball crosses over a rack tooth 121. Line Lz in FIG. 12 indicates the position of the end of the plunger 120 when the retraction of the plunger is once again blocked after the balls 160 cross over a rack tooth and engage with a steep rearward tooth surface. Arrows in FIGS. 10 through 12 indicate the directions in which the plunger 120, the annular ball seat 140 and the balls 160 are biased, respectively.

By virtue of the tooth structure of the plunger, wherein the forward tooth surfaces have a gradual slope and the rearward tooth surfaces are steeply sloped, and by virtue of the axial movability of the forwardly biased ball seat and its inclined ball grooves, the ball-type tensioner 100 is able to reduce two kinds of noise. First it can reduce "flip-flop" noises by blocking retracting displacement of the plunger 120 on engine start-up when the engine has been out of operation for a long time. By permitting retracting displacement of the plunger under conditions in which excessive chain tension occurs while the plunger is an excessively protruding condition, the tensioner is also able to eliminate the "beat note" or "whirring" noise that would otherwise be generated, and prevent seizing of the plunger.

Then, because gradually sloping forward surfaces 121a and the steep rearward surfaces 121b are formed so that the centers of the balls 160 always resides within the groove 112a in the wall of the plunger-accommodating hole 112, it is possible to achieve quick and steady response to increases and decreases in chain tension. Furthermore because the inclined ball-guiding grooves 143 are disposed equidistant around the ball seat, it is possible to achieve smooth advancing and retracting movement of the plunger 120 with changes in chain tension, and use the annular ball seat 140 for a long time.

The use of the ball-type tensioner according to the invention is not limited to timing drives using timing chains. The tensioner can also be used to maintain tension in a the chain of a balancer system, an oil pump drive, or similar mechanism, and can also be used in various belt drives.

Advantages of the invention can be realized in a tensioner in which the plunger biasing force is imparted solely by a spring, or in a tensioner in which the plunger is biased by a combination of spring force and hydraulic pressure.

The specific configuration of the tensioner housing can be varied. However, in the preferred embodiment, the housing has a plunger-accommodating hole, a plunger-biasing spring, and a groove formed in the wall of the plunger-accommodating hole adjacent the opening through which the plunger protrudes, for receiving an annular ball seat, a ball seat-biasing spring and a sealing plate. For instance, the housing may be an sealed housing mounted internally in an engine by bolts or other suitable means, or an externally-mounted tensioner housing having external threads which are threaded into an opening in a wall of an engine so that the plunger of the tensioner can apply tension to a chain within the engine.

The specific plunger rack tooth configuration can be varied as long as the tooth has an annular gradually sloping forward surface the diameter of which gradually decreases proceeding in the direction of protrusion of the plunger, and an annular, steeply sloping rearward surface the diameter of which rapidly decreases proceeding in the direction of retraction of the plunger. For instance, the angle of the gradual sloping forward tooth surface, i.e., the angle $\alpha$ is preferable around 20° with respect to the inner peripheral surface of the plunger-accommodating hole, while the angle $\beta$ of the steep rearward surface, is preferably around 65° with respect to the inner peripheral surface of the plunger-accommodating hole.

Furthermore, the plunger can reciprocate more smoothly in sliding contacting with the inner peripheral surface of the plunger-accommodating hole and the annular ball seat if a cylindrical outer tooth surface, i.e., a surface having a uniform diameter, is interposed between the gradually sloping forward tooth surface and the steep rearward tooth surface.

The specific number of the inclined ball-guiding grooves formed in the annular ball seat should be at least three, and the grooves should be disposed equidistant from one another in the seat surface of the annular ball seat. This arrangement prevents eccentric loads from being applied in the radial direction as the plunger advances and retracts.

The specific shape of the inclined ball-guiding grooves can be varied as long as they face the steep rearward surface of a rack tooth. If the angle $\theta$ of the inclined bottom surface is less than 50°, the movement of the ball becomes unreliable, blockage of retraction becomes excessive, and elimination of the "beat note" or "whirring" noise becomes more difficult. When the angle $\theta$ is greater than 85°, blocking of retraction of the plunger and elimination of "flip-flop" noises become difficult. Accordingly, the angle $\theta$ of the inclined bottom surface, measured with respect to the inner peripheral surface of the plunger-accommodating hole, is preferably in the range from 50° to 85°.

What is claimed is:

1. A ball-type tensioner, comprising:
a reciprocable plunger for maintaining tension in a traveling timing chain, said plunger having an outer peripheral surface in which a plurality of annular rack teeth is formed;
a housing having a plunger-accommodating hole, said plunger protruding from said plunger-accommodating hole and being reciprocably slidable therein in protruding and retracting directions;
a plunger-biasing spring biasing said plunger in the protruding direction;
an annular ball seat fitting around said plunger and displaceable along the directions of protrusion and retraction of the plunger, said ball seat being located within an annular groove formed in the wall of the plunger-accommodating hole, and having a plurality of ball-guiding grooves in which balls can move radially outward relative to the plunger;
a ball seat-biasing spring engaged with a surface of said annular ball seat and biasing the ball seat in the direction of protrusion of said plunger;
a set of balls in contact with the outer peripheral surface of the plunger and sequentially engageable with successive rack teeth of the plunger by moving radially outward in said ball-guiding grooves of the annular ball seat; and
a sealing plate surrounding, and in fitting relationship with, the plunger, the sealing plate engaging said balls and limiting axial displacement of said balls, the annular ball seat and the ball seat-biasing spring in the direction of protrusion of the plunger within said annular groove;
wherein each rack tooth has a forward surface facing in said protruding direction and a rearward surface facing in said retracting direction, the forward surfaces of said rack teeth having a diameter that decreases proceeding the protruding direction, and the rearward surfaces having a diameter that decreases proceeding in the rearward direction, the slope of the rearward surfaces relative to the protruding and retracting directions being greater than the slope of the forward surfaces relative to said protruding and retracting directions;
wherein the ball-guiding grooves of the annular ball seat has an inclined bottom surface that faces a rearward face of a rack tooth; and
wherein each of said balls simultaneously contacts the inclined bottom surface of a ball-guiding groove, said plunger and said sealing plate.

2. The ball-type tensioner according to claim 1, wherein the slopes of the forward and rearward surfaces of the rack teeth are sufficiently steep that the center of a ball disposed between a rearward surface and an adjacent forward surface of rack tooth is always within said annular groove.

3. The ball-type tensioner according to claim 1, wherein the annular ball seat has at least three ball-guiding grooves formed therein, and wherein the ball-guiding grooves in the annular ball seat are disposed at uniform intervals around said ball seat.

4. The ball-type tensioner according to claim 1, wherein the biasing force exerted by the ball seat-biasing spring is greater than the biasing force exerted by the plunger-biasing spring.

* * * * *